N. F. GARBO.
COMBINATION AUDITOR'S REPORT.
APPLICATION FILED SEPT. 17, 1900. RENEWED JULY 25, 1910.

985,994.

Patented Mar. 7, 1911.

WITNESSES

INVENTOR
NILS F. GARBO

HIS ATTORNEYS.

UNITED STATES PATENT OFFICE.

NILS F. GARBO, OF MINNEAPOLIS, MINNESOTA.

COMBINATION AUDITOR'S REPORT.

985,994.          Specification of Letters Patent.          Patented Mar. 7, 1911.

Application filed September 17, 1900, Serial No. 30,255. Renewed July 25, 1910. Serial No. 573,766.

*To all whom it may concern:*

Be it known that I, NILS F. GARBO, of the city of Minneapolis, county of Hennepin, State of Minnesota, have invented certain new and useful Improvements in Combination Auditors' Reports, of which the following is a specification.

My invention relates to auditor's statements or reports.

Heretofore, the various auditor's statements or reports that are required for the business of a large store have occupied many different book pages or sheets for each day, must be compiled separately, necessitate careful recapitulation and summarization, are with great difficulty made to check and balance, and require many hours in their preparation. These reports or statements are designed not only to verify the amounts of money turned over by the cashiers at the close of the day's business, and show the extent of the sales on account and the total deductions for goods returned, but should give results showing the volume of business done in each department and the comparative efficiency of each clerk. Under existing practices the labor involved in the preparation of these reports is so great that nothing is attempted after the close of the doors in the evening beyond determining the correctness of the amounts turned over by the cashiers, while in many cases the auditing of checks is not started until the following morning. The complete report requires the work of many assistants, and rarely reaches the manager's desk until late the next day. In large establishments it is frequently necessary, during special sales or unexpected demand for a particular line of goods, to temporarily transfer a clerk from one department to another, and it has been the custom to provide a clerk with a new sales book and another sales number when so transferred, and each clerk has usually one sales book for cash sales and another for sales on account, all of which tends to complicate the preparation of the reports in the general office and produce more or less confusion.

The object of my invention is to provide means whereby the various reports which now involve so much work and trouble may be made in compact form upon a single sheet, whereon each sale or transaction appears but once, while, without recapitulation, results are given showing individual and total receipts by cashiers, total charges or sales on account, total credits for goods returned, total cash sales, credits and charges for each department, and total sales and credits for each clerk.

A further object of my invention is to enable a clerk to sell in one or all departments without changing his or her sales number, and to use the same sales book for cash sales, sales on account, C. O. D., "Lay by" and "Will call" sales. And a further object of my invention is to provide a system whereby cash and sales checks from any clerk or department may be received by any one or several of the various cashiers, instead of by a certain particular cashier, whereby the work of the cashiers may be more evenly divided.

My invention consists generally in a sheet of suitable size with a plurality of horizontal folds adapted to overlap one another in such a manner as to leave exposed to view preferably a single footing line at the lower edge of each fold or division, the whole sheet being ruled into similar vertical columns, substantially one for each clerk employed, which columns are in turn grouped into departments by heavier lines or rulings, and provided with a totals column preferably at the right hand end of the sheet, and suitable spaces on the last or bottom fold or division for the identifying names or numbers of the clerks or departments. And my invention further consists in various details of construction, arrangement and use, all as hereinafter described and particularly pointed out in the claims.

My invention will be more readily understood by reference to the accompanying drawings, forming a part of this specification, and in which—

Figure 1 is a top plan of my auditor's statement, as the same appears when folded, the top fold being thrown back at one end. Fig. 2 is a plan of the top or upper portion of the sheet, unfolded. Fig. 3 is a vertical section of the folded sheet on line *x—x* of Fig. 1. Fig. 4 is an edge view of the sheet, taken from Fig. 2.

As shown in the drawings, my invention consists in a single large sheet of paper, ruled from top to bottom with lines A—A—A, dividing the sheet into a large number of narrow columns with a wide column at each side; the one at the left being intended to contain descriptive matter, and the one at the right being suitably ruled to receive the several totals of the several portions of the sheet. The large sheet is folded or plaited so as to reduce the height of the sheet to a fraction of its real height. These plaits or folds are each of a size to receive the entries of checks received from certain cashiers, and the lower edges of the folds or plaits overlie one another from the top to the bottom of the sheet as a whole. The horizontal space thus exposed on each plait below the upper one may be distinguished by a line or lines C, and these spaces are employed in footing the entries of the individual folds. There are as many folds as there are cashiers in the employ of the establishment, plus a fold for credits and another fold for charges, and, if desired, still another fold, should the same be required for the notation of checks other than cash, credit or charge slips or checks. The lowest fold that is devoted to a cashier, or, in other words, which is intended to receive entries of cash sales checks, is preferably provided with an additional footing line or space E, and such footing lines are also provided upon the folds that receive the entries of credit and charge slips. Furthermore, the last or bottom fold, which is usually devoted to credits, is provided with several horizontal lines, usually two more lines than any of the other folds, these being to receive the numbers of the clerks and the department numbers, respectively. Obviously, the folds may be of any depth desired. These sheets I term sections, and in large establishments, where there are large numbers of clerks, it is necessary to employ many of these sections, the capacity of each section being gaged according to the ability of the auditor's assistants to enter and foot the items.

Each of the sections is devoted to two or more departments of the store; that is, the checks as they come to the auditor's room, already sorted according to cashiers, are there sorted according to the numbers or names of departments, and the sorted checks are handed over to the assistants who are at work upon sections devoted to corresponding or respective departments. It is by reason of this adapting of the auditor's reports to work by departments that I am enabled to so readily divide the work among a large number of assistants, which would be practically impossible, or at least very inconvenient, if the work was laid out according to the numbers of clerks taken in regular rotation or sequence. In addition to the great convenience attained in the distribution of the work, my invention possesses the added advantage of permitting the work to go on by departments regardless of the sales numbers of the clerks, and a single clerk may sell goods in several or all of the departments without disturbing, confusing or complicating the auditing system.

The following is a detailed statement of the use and operation of my invention: Within a very short time after the opening of the store in the morning the sales checks begin to accumulate in the hands of the cashiers. From time to time these checks are bundled up and sent to the auditing room, where the work of sorting and entering progresses throughout the day. In the auditor's room the checks are sorted by departments, keeping separate those received from each cashier, and no attention being paid at this time to clerk's numbers. As before explained, there are two or more departments represented on each blank report or sheet, and as fast as the sales checks are sorted in the auditing room the work of entering the items is begun by the auditor's assistants. These items are entered with reference to both the number of the clerk making the sale and the cashier receiving the money, where the entry is of a cash transaction, the clerks' numbers having been previously set in the spaces provided therefor on the last or bottom fold of the sheet. It is evident that but one entry is required for each item, this single entry showing the amount involved, the nature of the transaction, the clerk making the sale, the department in which it was made, and the cashier receiving the money. As this work is continued throughout the day, it is evident that within a short time after the closing of the doors at night all the entries will have been made, and it will only remain to determine the various totals. As the first step is to check the cash turned over by the cashiers, all of the cash items in each fold or division representing one cashier are first footed by departments, the total for each department being placed in the space F on the bottom or exposed edge of each of the folds representing a cashier. When these totals have been properly entered for each cashier and department they are footed horizontally into the column B at the right hand end of the sheet. It is evident that each of these totals, in the column B, should correspond in amount with the amount of money turned over by the cashier whose number or name appears upon this fold or division, while the grand total, in the space G, indicates the amount of the total cash business for the day. In a like manner the total credits and total charges are determined by departments and entered in the spaces H and I, respectively, and also in a like manner are footed horizontally into the grand totals column B. The total charges being added and the total credits being deducted from the grand total of the cash sales, the result will be the net amount of the business for the day. The cashier's totals by departments in the exposed spaces F may then be footed vertically into the spaces K, and upon adding the total charges for the department the result, entered in the spaces L, will show the net sales for each department. The clerk's columns may then be footed vertically, results being entered in the spaces M, to determine the comparative efficiency of the clerks. Or, if desired, all of the items in one fold, representing the amounts received by one cashier, may be footed horizontally into the grand totals column B, thereby obviating the necessity of determining and entering the totals for each department by cashiers. In this case, after checking the amounts turned over by the cashiers, the items for each clerk are footed vertically into the spaces M, and the sum of these totals, footed horizontally, will show the total sales for the department.

It will be noted that the horizontal footings of the total sales by clerks, in the spaces M, should agree with the vertical footings of the total sales by departments. And in a like manner the correctness of the grand totals may be easily determined. This check upon the correctness of all entries, without recapitulation or summarization, is a feature of my invention. Another feature is the compactness of the report, eliminating many chances for error and facilitating the work of preparing the report during the time that the sales checks are being entered and while the cashier's accounts are being checked. Entries for clerk's sales are never confused with the totals for cashiers or departments. And in determining the comparative efficiency of the clerks the columns are footed from top to bottom, there being no reference to sub-totals for cashiers or charges, etc.

It is evident from the above that my completed auditor's report, checking the cashier's accounts, showing the total sales by each clerk, the nature of the transaction, the totals of the day's transactions by departments, the total charges or sales on account, the total credits for goods returned, the total cash sales, and the grand total of the net volume of business for the day, may be ready for inspection by the proper authority within a very short time after the close of the store in the evening.

Having thus described my invention, I claim as new and desire to secure by Letters Patent:

1. An auditor's statement or report consisting in a sheet having horizontal folds, one for each cashier plus extra folds for charges and credits, said sheet being divided into clerks' columns by vertical rulings, and the lower parts of each fold being exposed substantially as described.

2. An auditor's statement consisting in a sheet having horizontal folds, one for each cashier plus extra folds for charges and credits, said folds overlapping each other from the top to the bottom of the sheet and leaving exposed to view only the lower space on each fold between the top and bottom folds, said sheet being divided into clerks' columns by vertical rulings, substantially as described.

3. An auditor's statement consisting in a sheet having horizontal folds, one for each cashier plus extra folds for charge and credit items, said folds overlapping each other, leaving exposed to view only the lower space on each inner fold, said sheet being divided into clerks' columns by vertical rulings and having horizontal rulings for footings, substantially as described.

4. An auditor's statement consisting in a sheet having horizontal folds, one for each cashier plus extra folds for charge and credit items, said folds overlapping each other and leaving exposed a single space at the bottom of each inner fold, said sheets being divided into vertical clerks' columns and horizontal footings columns and having a totaling column at the end thereof, substantially as described.

5. An auditor's statement consisting in a sheet having horizontal folds, said folds overlapping but not entirely concealing each other from the top to the bottom of the sheet, said sheet being divided into vertical clerks' columns grouped into departments by heavier or easily distinguished lines, and having horizontal footings columns and a totaling column at the end thereof, substantially as described.

6. An auditor's statement or report comprising a sheet divided by a plurality of clerks' columns suitably grouped for departments, and said sheet having a plurality of overlapping folds each devoted to a distinct source of check receipts, substantially as described.

7. An auditor's statement consisting in a sheet ruled vertically and having a plurality of horizontal folds or plaits the lower edges or spaces whereof are successively exposed to facilitate distinct footings and show all thereof, said folds being adapted to be opened for the entering of items, substantially as described.

8. A statement or report comprising a single sheet provided with a plurality of columns divided into groups by vertical rulings and said sheet having a plurality of horizontal folds, a portion of each fold being visible when the sheet is folded whereby each fold of the sheet is adapted to receive columns of figures and show its footings beneath the footings of the fold above it, facilitating the footing of the vertical column of the sheet, each taken as a whole.

In testimony whereof I have hereunto subscribed my name, this 11th of September, 1900.

NILS F. GARBO.

In the presence of—
C. E. HAWLEY,
M. E. GOOLEY.

Copies of this patent may be obtained for five cents each, by addressing the "Commissioner of Patents, Washington, D. C."